United States Patent [19]
Creedon et al.

[11] Patent Number: 6,101,554
[45] Date of Patent: Aug. 8, 2000

[54] APPARATUS FOR CONTROLLING DATA FLOW USING LOOKUP TABLES TO LINK INCOMING PACKETS DIRECTLY TO OUTPUT PORTS

[75] Inventors: Tadhg Creedon, County Galway; Anne O'Connell, Castleknock, Dublin; Eugene O'Neill, County Dublin; Vincent Gavin, Chapel Hill; John Hickey, County Tipperary; Richard Gahan, County Wexford, all of Ireland; William P Sherer, Danville, Calif.

[73] Assignee: 3Com Ireland, Georgetown, Ky.

[21] Appl. No.: 08/973,177

[22] PCT Filed: May 30, 1996

[86] PCT No.: PCT/EP96/02338

§ 371 Date: Jun. 15, 1998

§ 102(e) Date: Jun. 15, 1998

[87] PCT Pub. No.: WO96/38792

PCT Pub. Date: Dec. 5, 1996

[30] Foreign Application Priority Data

May 31, 1995 [GB] United Kingdom ............. 9510935

[51] Int. Cl.[7] ...................................................... G06F 13/00
[52] U.S. Cl. ............................................................ 709/253
[58] Field of Search ........................ 364/DIG. 1 MS File, 364/DIG. 2 MS File; 709/200, 206, 207, 220, 223, 224, 225, 227, 228, 244, 250, 253

[56] References Cited

U.S. PATENT DOCUMENTS 5,140,585 8/1992 Tomikawa ............................. 370/354

FOREIGN PATENT DOCUMENTS

| 0 556148 | 8/1993 | European Pat. Off. . |
| WO-A-9303439 | 2/1993 | WIPO . |
| WO-96-38792 | 12/1996 | WIPO . |

*Primary Examiner*—Robert B. Harrell
*Attorney, Agent, or Firm*—Paul Davis; Wilson Sonsini Goodrich & Rosati

[57] ABSTRACT

Apparatus for monitoring and controlling data flow ina computer network device having a plurality of parts comprises control means for directly linking ports together on the basis of additional information stored in the control means whereby incoming packets are linked directly to an utput port to achieve high performance. The additional information is stored in one more look-up tables additional to the normal CAm with the or each table addressed by separate processing. This allows the implementation to be in hardware rather than in software.

7 Claims, 2 Drawing Sheets

| 1 bit | 1 bit | 6 bit | 1 bit | 1 bit | 1 bit | 1 bit | 3 bit |
|---|---|---|---|---|---|---|---|
| LOOK UP REQ | LINK ENABLE | DEST PORT | MULTI CAST/ BROADCAST PKT | CUT THRU | PORT ENABLE | STORE RX | OTHER CONT'L |
| 1 | 0 | 12 | 0 | 0 | 1 | 1 | ..... |
| | | | | | | | |
| | | | | | | | |
| | | | | | | | |

| DEST. PORT # W.G. CONTROL | DATA | DATA | DATA | DATA |
|---|---|---|---|---|

Fig.3

APPARATUS FOR CONTROLLING DATA FLOW USING LOOKUP TABLES TO LINK INCOMING PACKETS DIRECTLY TO OUTPUT PORTS

FIELD OF THE INVENTION

The present invention relates to apparatus for monitoring and controlling data flow in a computer network device.

BACKGROUND OF THE INVENTION

Computer networks are well known and basically there are two popular types i.e. a token ring network and an ethernet network. Such networks are now well defined. In other words, in order to have compatible equipment and software certain features have to be present in order to comply with the standard.

It is known to divide up a large network using devices called bridges and in ethernet technology a bridge is a defined device having defined characteristics. However, we have in the past modified such devices as that they retain i he defined operations of a bridge but also, within the device, handle data in a different manner so as to economize on memory. In our terminology a modified bridge is termed a switch.

In modern networks, more and more control of data flowing in the network is required in order to avoid bottlenecks which cause delays. There is thus a need for a high performance low cost switch or bridge.

SUMMARY OF THE INVENTION

The present invention proposes apparatus for monitoring and controlling data flow in a computer network device having a plurality of ports, the apparatus including control means for directly linking ports together on the basis of additional information stored in the control means whereby incoming packets are linked directly to an output port to achieve high performance.

Preferably, the additional information is stored in look-up table means additional to the normal CAM or equivalent mechanism- The look-up table means could be in the form of one large table or a plurality of smaller tables. Each table is addressed using separate processing.

This arrangement with its system of tables is ideal for implementation in hardware (e.g. in silicon), rather than in software, thus allowing for low cost implementation.

In order that the present invention be more readily understood an embodiment thereof will now be described by way of example with reference to accompanying drawings, in which:

BRIEF DESCRIPTION OF THE DRAWINGS

FIG. 2 shows a representation of one part of a device as shown in FIG. 1; and FIG. 3 shows diagrammatically a typical burst of data for transmission between ports in the device shown in FIG. 1.

DETAIL DESCRIPTION

Figure 1:
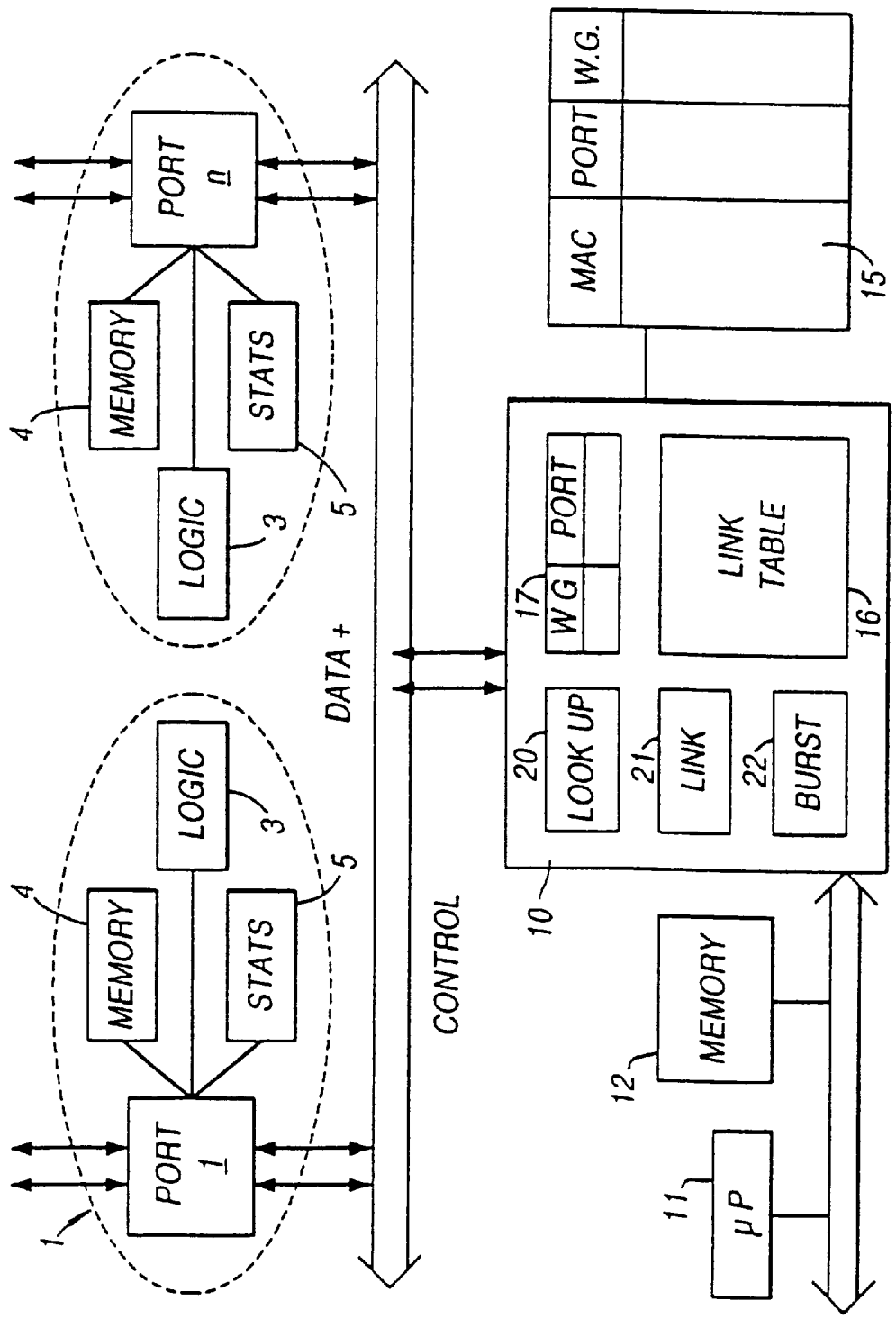
FIG. 1 shows a diagrammatic lay out of the structure of a device according to the present invention.

The preferred embodiment of the present invention is shown in FIG. 1 and will be seen to comprise a multi-port switch having ports 0 to n to which devices such as computer terminals, servers, printers and modems may be attached.

Within the switch there is a data bus and a control bus although for convenience, only a single bus is indicated in the drawing. Each port is connected to the data and control buses it is common to select one particular port to connect to rest of network. This port is known as the downlink port.

As will be seen from FIG. 1, each port is provided with transmit and receive buffers 4 in the form of memory devices.

Traffic through the switch is controlled by a control device generally indicate d by the reference numeral 10 which will be described in detail later. The control device is connected to the data and control buses and also communicates with a switch management entity in the form of a processor 11 and memory 12.

The control device 10 will now be described in more detail. It consists of look-up tables which are written into and read from under the control of three separate processing elements. One of the look-up tables is basically a modified content addressable memory (CAM) 15 or equivalent mechanism for storing MAC addresses and associated port numbers in a conventional manner. The CAM is used to store information associated with each MAC address, such as port number, age, types etc. Operation of the control device 10 is based upon a link table 16 which contains information relating to each of the ports of the switch and this table 16 is shown in more detail in FIG. 2. There is also a small down link table 17 and the inter-relationship between the three tables 15, 16 and 17 will also be described.

Let us assume there are 29 ports in the switch and that the device attached to port 0 wishes to communicate with another device in the network.

As soon as the packet stated being received by port 0, a lookup request flag is written into the memory section of port 0.

The lookup machine 20 in the control device 10 scans each receive port, whose port enable bit in the link table is set, for lookup request flags. On finding a lookup request, the lookup process is carried out by the lookup engine. This causes the source and destination addresses to be read from port 0 and stored by the control device. The lookup engine will determine the destination port for the packet, rind write the destination port, a multicast/broadcast indicator and a link request flag into the link table. It also causes the lookup request flag to be cleared in port 0.

The link engine, on finding the link request flag set in the kink table, will decide if the destination port is busy or not. If not, it sets a burst request flag in the link table. If it is busy, it does not set the bit in the link table, but sets a flag in the store Rx column and causes the packet to be stored at port 0 until the destination port becomes free whereupon the link engine will then set the burst request flag.

The burst engine, on seeing the burst request flag bit set, then permits port 0 to transmit to the destination port via the switch data bus the packet stored in its transmit memory. The preferred form of the burst is shown in FIG. 3.

Once the transmission is concluded which is determined by the burst engine, the link engine clears the task table of the entries relating to the source port in question. After each engine is finished its link it moves on to the next port. It is thus apparent that all processing engines are independent but act sequentially by passing a request on to the next engine by placing flags at the appropriate location in the link table. Also, the packet is not sent to a central store. Rather, it remains at the source port and, under the control of the burst engine, passes along the switch bus once to the destination port.

While the basic operation described above relates to the situation where both the source MAC address and destination MAC address are known to the control unit 10, it also applies to situations where the destination address is not known. This is because all unknown destination addresses are sent to the downlink port. The control unit keeps track of device MAC addresses and corresponding ports using a CAM in a conventional manner although here it is proposed that all destination addresses not on a port of the switch will be designated as having the downlink port as their associated port.

The above description applies to unicast traffic. In the case of broadcast or multicast traffic the operation is slightly different. For a port wishing to send a broad cast or multicast packet this request is noted by the look-up engine 20 which sets not only a link request flag but also a multicast/broadcast request flag. Once all destination ports are ready to receive the packet the link engine sets the burst flag and the burst engine then causes the packet to be transmitted once on to the switch data bus from where it is received simultaneously by all die destination ports.

Once the broadcast has taken place the burst request having been removed the link engine clears the link table for that entry.

The link table is also provided with indications for "cut through" operation. The link engine 21 can determine whether cut-through operation is appropriate having regard to the source and destination ports and if it is appropriate it places a flag in the cut-through column As mentioned above, the link table has a column indicating whether or not the requested transmission is of a broadcast or multicast packet. To facilitate handling of such requests, we propose that the ports of the switch be allocated an additional address indicating that devices attached thereto should be grouped together for operational purposes. These groups of device we will call work groups (WG).

Each port is given a work group number and as the device attached to a port wishes to communicate with another device, the packet has associated with it the work group number allocated to the port to which the source device is connected When the packet is transmitted across the switch bus, the work group of the source port is also transmitted as shown in FIG. 3. For multicast/unicast packets, only those destination ports whose work group matches will accept the packet. For unicast packets, only the destination port which matches the destination port and work group on the switch bus will accept then packet.

The use of work groups enables virtual networks to be set up within one hardware network. This avoids devices not in the work groups having to deal with broadcast messages not of interest to them.

What is claimed is:

1. A computer network device comprising:
   a plurality of ports each port being arranged to be connected to an external apparatus, and
   a data bus coupling the ports together in order to provide data flow between selected ports, wherein
   the device further comprises:
   a storage means associated with each port for storing a data to be transmitted to another port via the data bus and indicating means associated with each port for indicating a desire for such transmission, and
   a control means which comprises means for recognizing a desire of a port to transmit a data, means for determining an intended destination port of the data and means controlling access to the data bus for transmission of the data until such time as the intended destination port is available to receive the data.

2. A computer network device comprising:
   a plurality of ports each port being arranged to be connected to an external apparatus, and
   a data bus coupling the ports together in order to provide data flow between selected ports, wherein
   the device further comprises:
   a storage means associated with each port for storing a data to be transmitted to another port via the data bus and indicating means associated with each port for indicating a desire for such transmission, and
   a control means which comprises means for recognizing a desire of a port to transmit a data, means for determining an intended destination port of the data and means controlling access to the data bus for transmission of the data until such time as the an intended destination port is available to receive the data,
   wherein the control means includes
   a look-up means for monitoring the plurality of ports for an indication of the desire to transmit a data and generating a transmit request flag in response to the indication, link means responsive to the presence of a transmit request flag for storing said intended destination port or ports, and
   a monitoring means for monitoring the status of the intended destination port and for permitting transmission of the stored data on the data bus to the destination port.

3. The computer network device of claim 2, wherein the monitoring means is arranged to permit transmission of the data for a predetermined period of time.

4. The computer network device of claim 3, wherein the monitoring means is arranged to permit a plurality of transmissions of portions of the data, each for a predetermined period of time, until all of the data stored in said storage means has been transmitted.

5. The computer network device of claim 2, 3 or 4, wherein the look-up means, link means and the monitoring means are arranged to operate sequentially, and once having completed a task, return to an initial state.

6. The computer network device of claim 2, 3, 4 or 5 and comprising a look-up table for storing results of the operation of the look-up means, the link means and the monitoring means.

7. The computer network device of claim 2, wherein the intended port comprises more than one port in the plurality of ports.

* * * * *

UNITED STATES PATENT AND TRADEMARK OFFICE
CERTIFICATE OF CORRECTION

| | | |
|---|---|---|
| PATENT NO. | : 6,101,554 | |
| APPLICATION NO. | : 08/973177 | |
| DATED | : August 8, 2000 | |
| INVENTOR(S) | : Tadhg Creedon et al. | |

It is certified that error appears in the above-identified patent and that said Letters Patent is hereby corrected as shown below:

On the title page, at Item (75), add Ciaran Murphy, Kempton Heath, Ireland as an Inventor.

Signed and Sealed this
Twenty-fifth Day of January, 2011

David J. Kappos
*Director of the United States Patent and Trademark Office*

UNITED STATES PATENT AND TRADEMARK OFFICE
Certificate

Patent No. 6,101,554                                                            Patented: August 8, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tadhg Creedon, County Galway (IE); Anne O'Connell, Castleknock, Dublin (IE); Eugene O'Neill, County Dublin (IE); Vincent Gavin, Chapel Hill (IE); John Hickey, County Tipperary (IE); Richard Gahan, County Wexford (IE); William P. Sherer, Danville, CA (US); and Ciaran Murphy, Kempton Heath (IE).

Signed and Sealed this First Day of February 2011.

*KIM HUYNH*
*Supervisory Patent Examiner*
*Art Unit 2400*
*Technology Center 2400*